(12) United States Patent
Lewis et al.

(10) Patent No.: US 6,296,204 B1
(45) Date of Patent: Oct. 2, 2001

(54) RESTRAINT SYSTEM FOR A FLIGHT HELMET

(75) Inventors: Donald J. Lewis; Terry W. Merrifield, both of Scottsdale, AZ (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/644,161

(22) Filed: Aug. 22, 2000

Related U.S. Application Data

(60) Provisional application No. 60/151,871, filed on Aug. 31, 1999.

(51) Int. Cl.$^7$ ................................. B64C 1/00; A42B 3/00
(52) U.S. Cl. ............................ 244/122 AG; 2/6.1; 2/6.2; 2/413
(58) Field of Search ........................... 244/122 AG, 121, 244/6.1, 6.2, 6.3, 411, 413; 2/6.1, 6.2, 6.3, 411, 413

(56) References Cited

U.S. PATENT DOCUMENTS

| | | | |
|---|---|---|---|
| 5,039,035 | * | 8/1991 | Fitzpatrick .................... 244/122 AG |
| 5,287,562 | * | 2/1994 | Rush, III ................................. 2/413 |
| 5,301,903 | * | 4/1994 | Aronne ......................... 244/122 AG |
| 5,546,609 | * | 8/1996 | Rush, III ................................. 2/413 |
| 6,014,769 | * | 1/2000 | Baudou et al. .......................... 2/6.1 |

* cited by examiner

*Primary Examiner*—J. Woodrow Eldred
(74) *Attorney, Agent, or Firm*—Jerry J. Holden

(57) ABSTRACT

A restraint system for a flight helmet that functions to hold the head steady and centrally located in the aircraft seat. The inflatable is stored on the helmet and upon activation of an ejection sequence. The inflatable member is inflated and breaks a frangible cover to rest on the shoulders. In addition, the inflatable member operates to seal the neck and, in another embodiment, to shield the face from the windblast the air crewmember encounters during ejection. The inflatable member can also function to lift the head and reduce spinal compression encountered during ejection.

5 Claims, 2 Drawing Sheets

RESTRAINT SYSTEM FOR A FLIGHT HELMET

CROSS REFERENCE TO RELATED PROVISIONAL APPLICATION

This non-provisional application claims the filing date of Provisional Application having Serial No. 60/151,871 filed on Aug. 31, 1999, titled "Restraint Systems for a Flight Helmet".

FIELD OF INVENTION

This invention relates to aircrew ejection in general and more particularly to a restraint system for securing and protecting the crewmember's head during ejection from the aircraft.

BACKGROUND OF THE INVENTION

Of major concern when a fighter aircraft is disabled in the air, is ejecting the crewmembers safely. In fighter aircraft, the air crewmembers initiate the process of ejection by pulling on an ejection handle, squeezing an ejection handle or some similar device to initiate ejection. The canopy that encloses the air crewmembers inside the aircraft cockpit is first blown or cut away. Next, the seat ejects out of the aircraft by a ballistic catapult along guide rails and the seat and air crewmember sitting thereon begins to enter the windblast. After the seat separates from the guide rails, it is propelled clear of the aircraft by rocket motors. When the seat reaches a safe trajectory, a parachute deploys for returning the air crewmember to the earth. The seat is stripped from the aircrew member and falls back to earth.

The proper positioning of the air crewmember in his seat is necessary for a safe ejection from the aircraft. Such a positioning is requires that the air crew member is correctly aligned in his seat and that his arms and legs are safety stowed. Many factors affect positioning such as the attitude of the aircraft, is it flying straight, level and upright or is it in some other position?

A system identified as Inflatable Body and Head Restraint System, "IBAHRS" has been proposed which provides a pair of inflatables inside the vertical harness that extends from the five point rotary buckle to each shoulder. IBAHRS is a passive system that automatically tightens the harness at the onset of the crash. The inflatable pretensions the straps and forces the occupant back against the seat. This action lessens the chances of the air crew member from striking cockpit objects during the emergency.

SUMMARY OF THE INVENTION

It is a principal advantage of the present invention to protect his head during ejection.

It is yet another advantage of the present invention to ensure that an air crewmember's helmet and head are properly supported by an inflatable between the helmet and the shoulders.

These and other advantages are found in a restraint system for a flight helmet for an aircrew member having a helmet. An inflatable member is stored inside of the helmet. The inflatable member is secured along one of its edges and below the headband. The member is adapted to be inflated by receiving inflating fluid through an inlet. A frangible cover is around the inflatable member. The cover maintains the inflatable member along the liner of the helmet and guides the inflatable downward from the liner. An inflator is operatively connected to the inlet for generating an inflating fluid for inflating the inflatable member.

A control means is operatively connected to the helmet and is responsive to an ejection signal for igniting the inflator. The ejection signal is initiated by the crewmember and is generated by ejection controls.

BRIEF DESCRIPTION OF THE DRAWINGS

These and other advantages will become apparent from the detailed description and the following drawings in which.

DETAILED DESCRIPTION OF THE PREFERRED EMBODIMENTS

Figure 1:
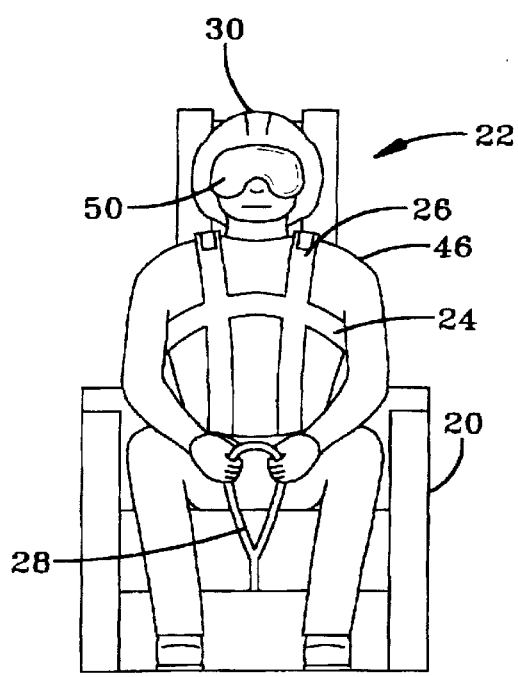
FIG. 1 is front view of an air crewmember in an ejection seat.
Figure 2:
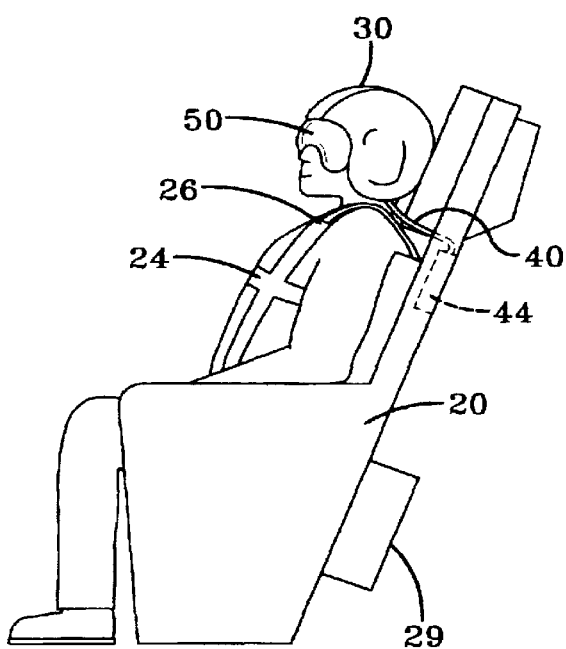
FIG. 2 is a side view of FIG. 1.
Figure 3:
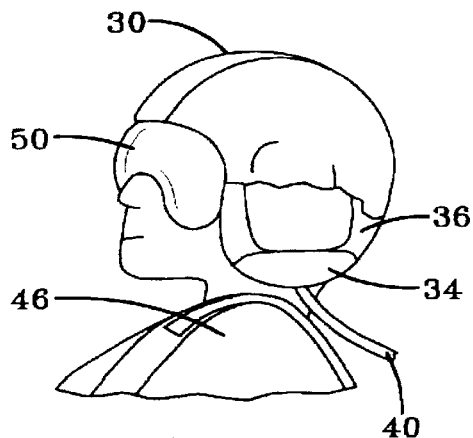
FIG. 3 is a view of the helmet with parts broken away showing the inflatable.
Figure 4:
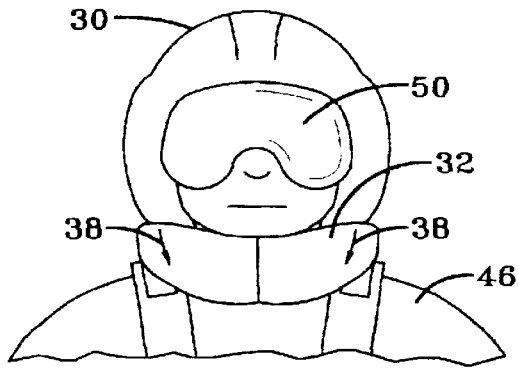
FIG. 4 is a front view of crewmember with the inflatable extending down from the helmet.
Figure 5:
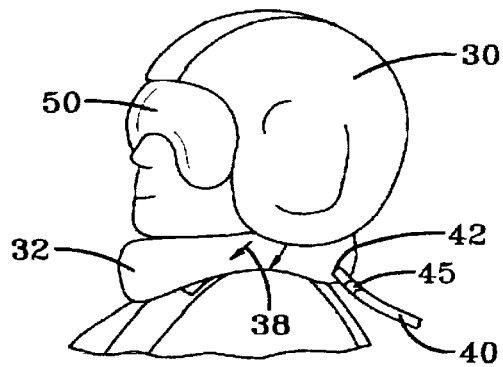
FIG. 5 is a side view of FIG. 4.
Figure 6:
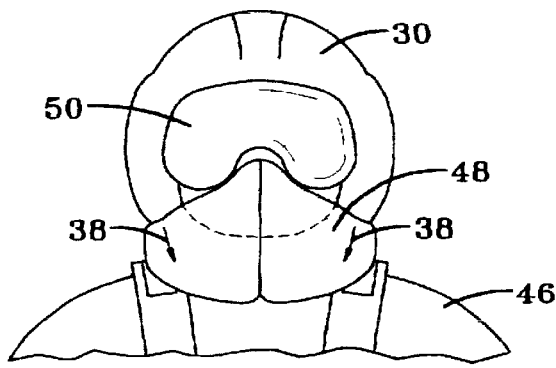
FIG. 6 is another embodiment of the inflatable member.
Figure 7:
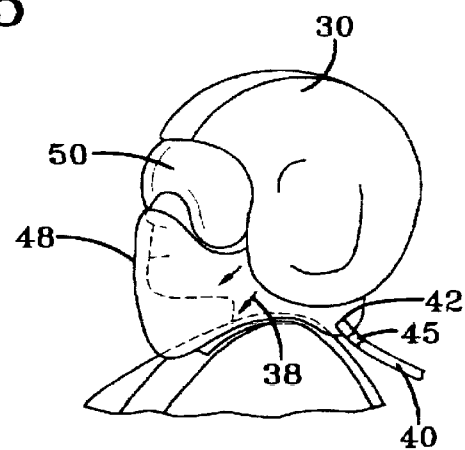
FIG. 7 is a side view of FIG. 6.

Referring to FIG. 1 there is illustrated an air crewmember 22 in an aircraft seat 20. In this FIG., the crewmember 22 is secured to the seat by various belts and harnesses such as chest harness 24 and shoulder harness 26, collectively hereinafter called harnesses. It is the function of such harnesses to keep the air crewmember 22 in the aircraft seat 20 and to prevent the air crewmember from hitting the various equipment and aircraft structure in the cockpit during normal flying maneuvers. The harnesses allow the air crewmember 22 to move his body while operating the aircraft to control the movement thereof.

When the air crewmember 22 has to be ejected from the aircraft due to aircraft having a failure in one or more of its mechanisms such that the aircraft can not fly, the crewmember 22 pulls on the ejection handle 28 or ejection device. This generates an ejection signal from a control system 29. From that moment on, the control systems in the aircraft and on the aircraft seat 20 prepare to eject the air crewmember 22 from the aircraft. The canopy is removed, and various propelling devices such as rockets move the seat along on or more rails and out of the aircraft. After clearing the aircraft, a series of events take place typically parachutes deploy, the air crewmember 22 separates from his aircraft seat 20 and descends safely to the ground.

The preferred embodiment of the restraint system for a flight helmet 30 operates to protect the head of the air crewmember 22 during the ejection. Located in the air crewmember's helmet 30 secured along one of the inflatable member's edges to the edge of the helmet is an inflatable member 32. Enclosed in a frangible cover 34 inside the helmet 30 is the inflatable member 32. The frangible cover is secured to the helmet and below the headband 36 allowing the inflatable member, when the cover is broken, to extend out of the helmet 30 in the direction of the arrows 38 in FIGS. 4–7. The frangible cover 34 also functions to guide the inflatable member 32 downward from the headband 36 and out of the helmet 30. An inflation tube or conduit 40 is connected between an inlet 42 in the inflatable member 32 and a source of inflation fluid 44 that may be coming from the seat 20 or contained within the helmet 30. The source of the inflation fluid 44 may be one or more inflators that ignited by a control system 29 responsive to the ejection sequence. In order to maintain pressure in the inflatable member 32 once it is inflated, there may be a one-way valve member 45 located at the inlet 42 in fluid communication with the inflatable member and the inflator. The one-way valve member 45 allows the inflation fluid into the inflatable member but does not allow it to escape once the conduit 40 disconnects from the inflator 44. As illustrated, the one-way valve member 45 is located in the conduit 40 at the inlet 42. In the alternative, the one-way valve member 45 may be located inside the inflatable member 32 adjacent the inlet 42.

The ejection sequence begins by the air crewmember 22 pulling back on the ejection handle 28 or ejection device. The inflatable member 32 inflates bearing down on the shoulders 46 of the air crewmember 22 in the direction of the arrows 38. By extending the inflatable member 32 down to the shoulders, the weight of the head and the helmet 30 and the various forces acting thereon are supported by the shoulders 46 and not the spine of the air crewmember 22. This assists in avoiding spinal compression that may injure the air crewmember 22.

In addition, the inflatable member 32 extends around the front of the helmet 30 encircling the neck of the air crewmember 22 and closes to deflect the windblast from entering the helmet. The force of the windblast is about eleven-psi and is sufficient to separate the helmet from the head of the air crewmember 22.

In another embodiment, a modified inflatable member 48 extends from the helmet 30 to the shoulders 46, encircling the neck and then extends upwards to approximately above the nose and below and eyeshield 50 being worn. This embodiment forms a shield to the windblast and protects the face.

When the air crewmember 22 and the seat 20 separate after ejection, the helmet 30 remains on the air crewmember's head further protecting him as he/she descends under the parachute.

There has thus been shown and described a restraint system for a flight helmet that functions to hold the head steady and centrally located in the aircraft seat. The inflatable is stored in the helmet and upon activation of an ejection sequence, the inflatable member is inflated and breaks a frangible cover to rest on the shoulders. In addition, the inflatable member operates to seal the neck and, in another embodiment, to shield the face from the windblast the air crewmember encounters during ejection. The inflatable member can also function to lift the head and reduce spinal compression encountered during ejection.

What is being claimed is:

1. A restraint system for the head and neck of an aircrew member in an aircraft comprising:

a helmet;

an inflatable member stored inside of said helmet, said inflatable secured along one of its edges in said helmet and adapted to inflate by receiving inflating fluid through an inlet in said inflatable member;

a frangible cover around said inflatable member, said cover maintaining said inflatable member along said helmet and guiding said inflatable member downward from said liner;

an inflator operative connected to said inlet for generating inflating fluid for inflating said inflatable member; and a control system for igniting said inflator operatively connected to said helmet and responsive to an ejection signal initiated by the aircrew member to eject the aircrew member from his aircraft.

2. A restraint system according to claim 1 wherein said inflatable member is operable to provide a force upon the aircrew member's shoulder for supporting the head of the aircrew member thereby reducing the load on the spine of the aircrew member.

3. A restraint system according to claim 1 wherein said inflatable member upon inflation encircles the neck of the aircrew member and the ends of said inflatable member meet for securely holding said inflatable member around the neck of the aircrew member and for preventing windblast from flowing into and around the neck.

4. A restraint system for the head and neck of a member wearing a helmet comprising:

a helmet;

an inflatable member stored inside of said helmet, said inflatable secured along one of its edges in said helmet and adapted to inflate by receiving inflating fluid through an inlet in said inflatable member, said inflatable member upon inflation operates to form a shield extending from the chest of the member to above the nose to shield said member's face;

a frangible cover around said inflatable member, said cover maintaining said inflatable member along said helmet and guiding said inflatable member downward from said liner;

an inflator operative connected to said inlet for generating inflating fluid for inflating said inflatable member; and a control system responsive to an actuation signal and operatively connected to said helmet for igniting said inflator.

5. A restraint system according to claim 4 wherein said inflator is located in the seat of the member's vehicle and is operatively connected to said inflatable member inlet by an inflation tube.

* * * * *